(12) United States Patent
Gutierrez et al.

(10) Patent No.: US 12,469,014 B2
(45) Date of Patent: Nov. 11, 2025

(54) CRYPTOCURRENCY MINER AND JOB DISTRIBUTION

(71) Applicant: Chain Reaction Ltd., Yokneam (IL)

(72) Inventors: Rony Gutierrez, Pardes Hanna-Karkur (IL); Michael Tal, Yoqneam Illit (IL); Zvi Shteingart, Moscow (RU)

(73) Assignee: CHAIN REACTION LTD., Yokneam (IL)

( * ) Notice: Subject to any disclaimer, the term of this patent is extended or adjusted under 35 U.S.C. 154(b) by 196 days.

(21) Appl. No.: 17/892,614

(22) Filed: Aug. 22, 2022

(65) Prior Publication Data

US 2024/0062170 A1    Feb. 22, 2024

(51) Int. Cl.
| | |
|---|---|
| *G06Q 20/00* | (2012.01) |
| *G06Q 20/06* | (2012.01) |
| *H04L 9/00* | (2022.01) |
| *H04L 9/32* | (2006.01) |

(52) U.S. Cl.
CPC ......... *G06Q 20/065* (2013.01); *H04L 9/3236* (2013.01); *H04L 9/50* (2022.05); *G06Q 2220/00* (2013.01); *H04L 2209/56* (2013.01)

(58) Field of Classification Search
None
See application file for complete search history.

(56) References Cited

U.S. PATENT DOCUMENTS

| | | | | |
|---|---|---|---|---|
| 6,097,811 | A * | 8/2000 | Micali | H04L 9/3236 |
| | | | | 713/186 |
| 10,841,372 | B1 * | 11/2020 | Ram | H04L 65/80 |
| 11,722,462 | B1 * | 8/2023 | List | H04L 9/3247 |
| | | | | 713/176 |
| 2011/0145137 | A1 * | 6/2011 | Driemeyer | G06Q 20/10 |
| | | | | 705/39 |
| 2011/0246774 | A1 * | 10/2011 | Phillips, II | G06F 21/602 |
| | | | | 713/168 |
| 2011/0307659 | A1 * | 12/2011 | Hans | H03M 7/3084 |
| | | | | 711/E12.001 |
| 2017/0243176 | A1 * | 8/2017 | Hanke | G06Q 20/0655 |
| 2019/0303790 | A1 * | 10/2019 | Harvilla | G06Q 20/3567 |
| 2019/0370793 | A1 * | 12/2019 | Zhu | H04L 9/50 |

(Continued)

FOREIGN PATENT DOCUMENTS

WO    2015077378 A1    5/2015

OTHER PUBLICATIONS

Dos Santos; Candidate Set Formation Policy for Mining Pools; 2020 IEEE; pp. 415-420; 2020.*

(Continued)

*Primary Examiner* — Radu Andrei

(74) *Attorney, Agent, or Firm* — McAndrews, Held & Malloy, Ltd.

(57) ABSTRACT

Distribution of jobs among compute modules of a cryptocurrency miner is disclosed. A cryptocurrency miner may include a serial bus, compute modules, and a controller. The controller may receive a candidate block, generate jobs based on the candidate block, and distribute the jobs among the plurality of compute modules by issuing a job submit command to the compute modules via the serial bus. The job submit command may comprise block sets that at least partially define the plurality of jobs. The block sets may include a plurality of midstates that correspond to a plurality of message blocks.

19 Claims, 9 Drawing Sheets

(56) References Cited

U.S. PATENT DOCUMENTS

| | | | |
|---|---|---|---|
| 2019/0392470 A1* | 12/2019 | Blanton | G06Q 30/0215 |
| 2020/0013027 A1* | 1/2020 | Zhu | H04L 9/50 |
| 2020/0403984 A1 | 12/2020 | Minehan | |
| 2021/0084060 A1* | 3/2021 | Garg | H04L 63/1466 |
| 2021/0194672 A1 | 6/2021 | Narayanam et al. | |
| 2023/0401169 A1* | 12/2023 | Tal | G06Q 40/04 |

OTHER PUBLICATIONS

Kilic; Parallel Analysis of Ethereum Blockchain; Springer Verlag; pp. 1885-1898; 2022.*

Leva; Control-oriented modelling of proof-of-work blockchains; ECC 2019; pp. 2873-2878; 2019.*

Ning; CapJack_ Capture In-Browser Crypto-jacking; Old Dominion University; pp. 1873-1881; 2020.*

Kilic B, Ozturan C, Sen A., Parallel analysis of Ethereum blockchain transaction data using cluster computing. Cluster Computing. Jun. 2022;25(3):1885-98. <https://link.springer.com/content/pdf/10.1007/s10586-021-03511-0.pdf?pdf=button> Jun. 25, 2022.

International Search Report and Written Opinion for Application No. PCT/IB2023/055949, mailed Sep. 27, 2023, 8 pages.

"AsicBoost—A Speedup for Bitcoin Mining", Dr. Timo Hanke, Mar. 31, 2016, 10 pages.

"Crypto Mining: Network Difficulty, Share Difficulty and Hash Functions", Luxor Tech, Feb. 20, 2020, 6 pages.

"Mastering Bitcoin", Andreas M. Antonopoulos, Published by O'Reilly Media, Inc. 2010, 87 pages.

Federal Information Processing Standards Publication, Aug. 2015, 36 pages.

"Optimising the SHA256 Hashing Algorithm for Faster and More Efficient Bitcoin Mining", Rahul P. Naik, Department of Computer Science, University College of London, Sep. 2, 2013, 65 pages.

BitmainAntminer—Youtube video, https://www.youtube.com/watch?v=_R36wWMM34M.

MicroBT Whatsmainer—Youtube video, https://www.youtube.com/watch?v=6vtq1m8w5eQ.

SHA-256 The Center of Bitcoin—Andreas M. Antonopoulos—Youtube video, https://www.youtube.com/watch?v=TvqDbLnsSNs.

* cited by examiner

Command Format

| DevID 16 bits | Rsvd 4 bits | Opcode 4 bits | Command Data Variable # bits | CRC 16 bits |

*FIG. 6*

Job Submit Command Format

| DevID 16 bits | Rsvd 4 bits | Opcode 4 bits | Num_BS 8 bits | Flags 8 bits | Job Element | CRC 16 bits |

*FIG. 7*

Job Element Format

| MB_GID<br>8 bits | MB Element | BS_GID<br>8 bits | Block<br>Set Element | ••• | BS_GID<br>8 bits | Block<br>Set Element |

FIG. 8

Message Block Element (MB Element) Format

| Zeros<br>Target<br>8 bits | MB_ID<br>16 bits | MerkleRoot Tail<br>32 bits | Timestamp<br>32 bits | Difficulty<br>32 bits |

FIG. 9

Block Set Element (BS Element) Format

| BS_ID<br>16 bits | MB1_MidState<br>256 bits | ••• | MB1_MidState<br>256 bits |

FIG. 10

CRYPTOCURRENCY MINER AND JOB DISTRIBUTION

BACKGROUND

Cryptocurrency is a digital asset designed to work as a medium of exchange. Individual coin ownership records are stored in a ledger or blockchain. Unlike conventional currencies, cryptocurrency does not typically exist in a physical form and is typically not issued by a central authority.

A blockchain provides a continuously growing list of records, called blocks, which are linked and secured using cryptography. Each block typically contains a hash pointer as a link to a previous block, a timestamp, and transaction data. By design, blockchains are inherently resistant to modification of the data. A blockchain is typically managed by a peer-to-peer network collectively adhering to a protocol for validating new blocks. Once recorded, the data in any given block cannot be altered retroactively without the alteration of all subsequent blocks, which requires collusion of the network majority.

In cryptocurrency networks, miners validate cryptocurrency transactions of a new candidate block for the blockchain via a Proof-of-Work algorithm. A side effect of validating the candidate block is the creation of newly minted cryptocurrency. The newly minted cryptocurrency as well as associated service fees are awarded to the miner that was the first miner to validate the candidate block and thus complete the Proof-of-Work algorithm.

This winner-takes-all compensation scheme has created an arms race for more efficient miners. Furthermore, mining pools have developed in an attempt to lessen the risks associated with the winner-takes-all compensation scheme. Miners or members of a mining pool share their processing power and split any obtained reward among the members according to the amount of work they contributed.

Limitations and disadvantages of conventional and traditional cryptocurrency mining approaches will become apparent to one of skill in the art, through comparison of such approaches with the present disclosure as set forth in the remainder of the present disclosure with reference to the drawings.

BRIEF DESCRIPTION OF SEVERAL VIEWS OF THE DRAWINGS

FIG. 6 shows an example command format used by the miner controller of FIG. 2.

FIG. 7 shows an example job submit command format used by the miner controller of FIG. 2.

FIG. 8 shows a job element format of the job submit command format of FIG. 7.

FIG. 9 shows a message block element format of the job element format of FIG. 8.

FIG. 10 shows a block set element format of the job element format of FIG. 8.

SUMMARY

Figure 1:
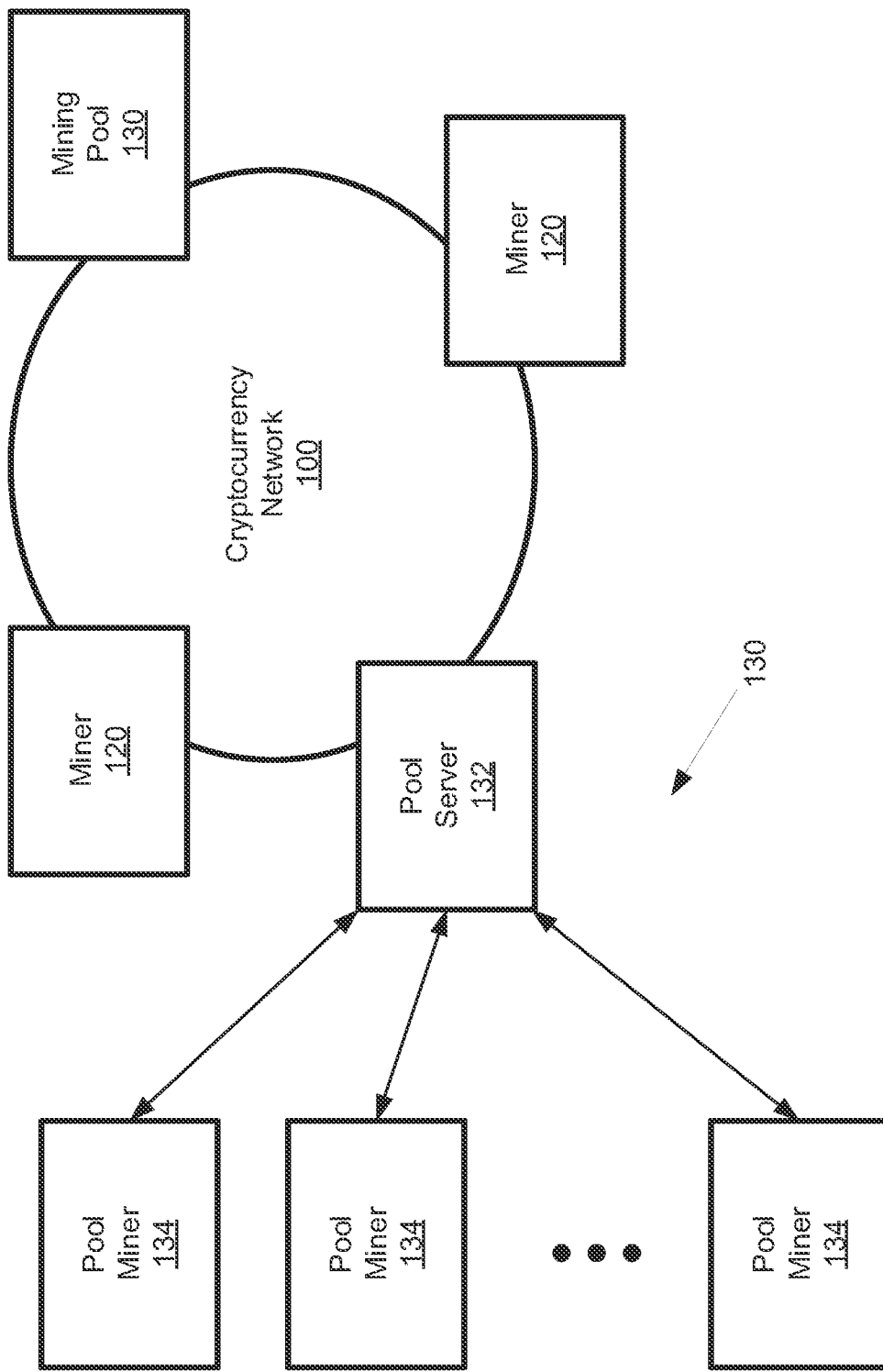
FIG. 1 shows a cryptocurrency network comprising miners in accordance with various aspects of the present disclosure.

Cryptocurrency miners and associated methods and apparatus are substantially shown in and/or described in connection with at least one of the figures, and are set forth more completely in the claims.

Advantages, aspects, and novel features of the present disclosure, as well as details of illustrated embodiments, will be more fully understood from the following description and drawings.

DETAILED DESCRIPTION OF VARIOUS ASPECTS OF THE DISCLOSURE

Various aspects of the present disclosure are presented by way of example. Such examples are non-limiting, and thus the scope of various aspects of the present disclosure should not necessarily be limited by any particular characteristics of the provided examples. In the following, the phrases "for example," "e.g.," and "exemplary" are non-limiting and are generally synonymous with "by way of example and not limitation," "for example and not limitation," and the like.

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y and/or z" means "one or more of x, y, and z."

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component, or a first section could be termed a second element, a second component, or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example a component may be turned sideways so that its "top" surface is facing horizontally and its "side" surface is facing vertically, without departing from the teachings of the present disclosure.

In the drawings, various dimensions (e.g., thicknesses, widths, lengths, etc.) may be exaggerated for illustrative clarity. Additionally, like reference numbers are utilized to refer to like elements through the discussions of various examples.

The discussion will now refer to various example illustrations provided to enhance the understanding of the various aspects of the present disclosure. It should be understood that the scope of this disclosure is not limited by the specific characteristics of the examples provided and discussed herein.

Referring now to FIG. 1, an embodiment of a cryptocurrency network 100 is shown. In particular, the cryptocurrency network 100 may be implemented as a Bitcoin network. The present disclosure focuses primarily upon Bitcoin and the Bitcoin network. However, aspects of the present disclosure are also applicable to other cryptocurrencies, also referred to as Altcoin, such as, for example, Litecoin, Dogecoin, Ethereum, etc. and their respective networks. Similarly, the present disclosure focuses primarily on aspects of mining pool miners that are members of a Bitcoin mining pool. However, aspects of the present disclosure are also applicable to standalone miners, distributed miners, and/or mining pool miners of Bitcoin and/or Altcoin networks.

As shown, the cryptocurrency network 100 may include multiple miners 120 (e.g., standalone miners and/or distributed miners) and multiple mining pools 130, which are operably coupled to one another via various networks such as LANs, WANs, cellular, satellite, and/or communication networks. The miners 120 and mining pools 130 of the cryptocurrency network 100 compete with each other in a decentralized manner to create a new block of processed Bitcoin transactions (e.g., transfers of Bitcoin between parties), and add the newly created block to the blockchain for the cryptocurrency network 100.

The blockchain is essentially a growing list or ledger of cryptographically linked records of transactions called blocks. Each block includes a cryptographic hash of the previous block, a timestamp, transaction data, and potentially other fields. The blocks form a chain, with each additional block reinforcing the ones before it. As such, blockchains are resistant to modification because any given block cannot be altered retroactively without altering all subsequent blocks.

The creation of a new block is designed to be computationally intensive so as to require the cryptocurrency network 100 to spend a specified amount of time on average to create a new block. For example, the Bitcoin network is designed to create and add a new block to the blockchain every 10 minutes on average. The cryptocurrency network 100 periodically adjusts the computational difficulty of creating a new block to maintain the 10 minute target. In this manner, the cryptocurrency network 100 may create new blocks in a relatively steady manner despite ever changing computational capacity. For example, adding new miners 120, mining pool miners 134, and/or mining pools 130 to the cryptocurrency network 100 increases the overall computational capacity of the cryptocurrency network 100. Such increased computational capacity reduces the time required to create and add a new block to blockchain. However, the cryptocurrency network 100 periodically adjusts the computational difficulty of creating a new block to maintain the 10 minute target. As a result, the cryptocurrency network 100 eventually detects that blocks are being created at a rate faster than the 10 minute target and appropriately increases the difficulty of creating a new block so as to counteract the increased computational capacity and maintain the roughly 10 minutes per block average.

To incentivize parties to undertake the computationally difficult task of generating a new block, the cryptocurrency network 100 compensates the miners 120 and mining pools 130 for their efforts. In particular, each new block generates a quantity of new currency (e.g., 6.25 Bitcoins) as well as service fees from all transactions in the block. These new coins and service fees are awarded to the first entity (e.g., miner 120 or mining pool 130) that solves the Proof-of-Work algorithm for the next block to be added to the blockchain. The Proof-of-Work algorithm is essentially a computationally intensive process that creates a new block that satisfies a cryptographic hash target. Thus, the miners 120 and mining pools 130 are in competition with one another since only the first entity to solve the Proof-of-Work algorithm receives the associated block award.

Given the all or nothing nature of the block awards, mining pools 130 have formed. In general, a mining pool 130 includes a pool server 132 and several mining pool miners or members 134. The pool server 132 divides the Proof-of-Work into substantially smaller jobs and distributes such smaller jobs to the mining pool miners 134 in the mining pool 130. By completing smaller jobs, mining pool miners 134 obtain shares of a block award won by the mining pool 130. In this manner, each of the mining pool miners 134 may earn a smaller award (e.g., a share of a block award proportional to their contribution to completing the Proof-of-Work) on a more frequent basis than if each of the mining pool miners 134 were operating as a miner 120 on its own.

Figure 2:
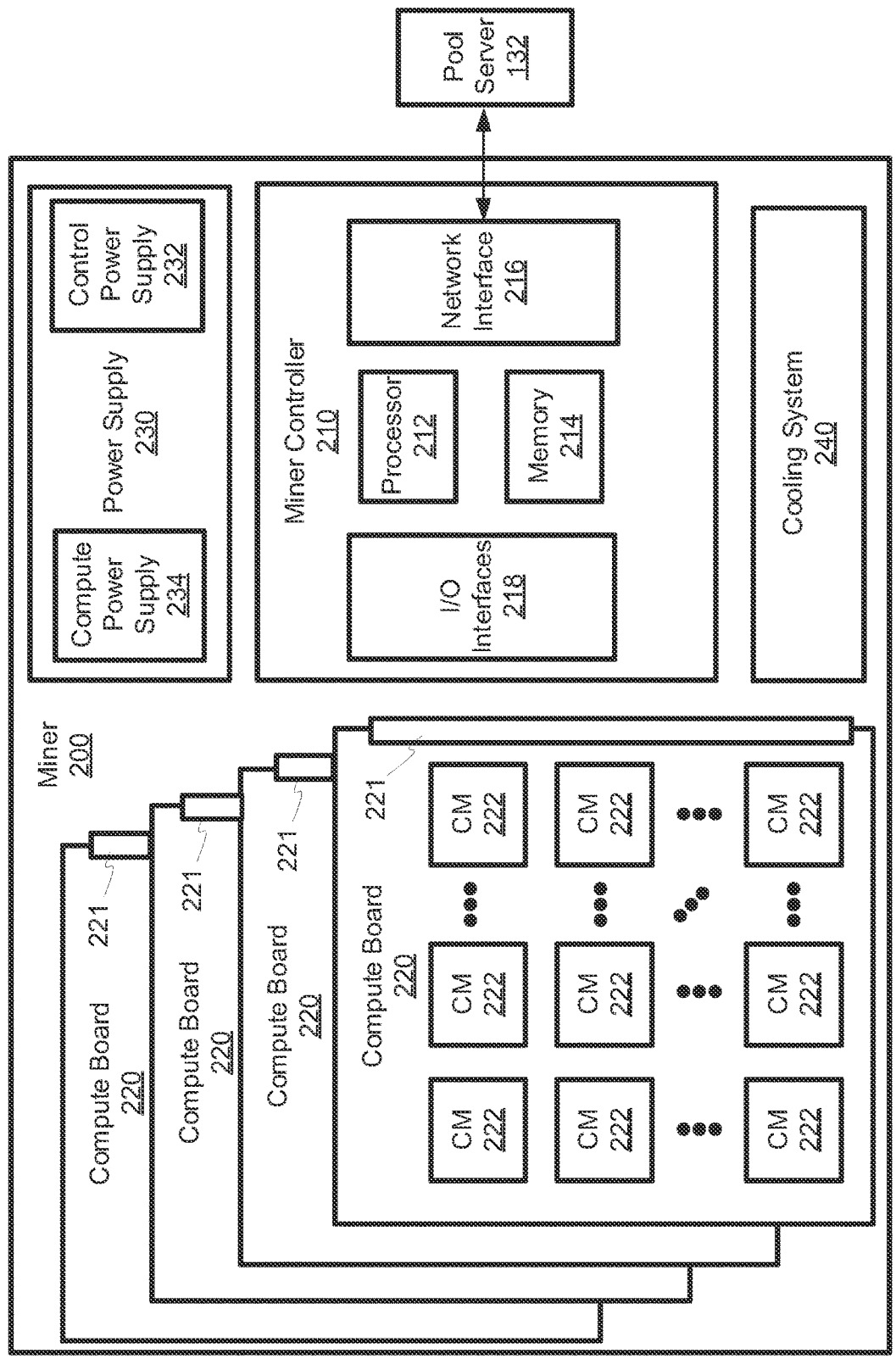
FIG. 2 shows a block diagram of a miner of FIG. 1.

A block diagram of a miner 200 is shown in FIG. 2, which is suitable for implementing one of the mining pool miners 134 of the mining pool 130. As shown, the miner 200 includes a miner controller 210, compute boards 220, a power supply 230, and a cooling system 240.

The miner controller 210 generally manages the components of the miner 200. In particular, the miner controller 210 interacts with pool server 132 on the behalf of the compute boards 220. To this end, the miner controller 210 obtains jobs from the pool server 132, distributes the jobs to the compute boards 220, and submits Proof-of-Work to the pool server 132 for the jobs completed by the compute boards 220.

As shown, the miner controller 210 may include a processor 212, memory 214, a network interface 216, and various input/output (I/O) interfaces 218. The processor 212 may be configured to execute instructions, manipulate data, and generally control operation of the other components of the miner 200 as a result of its execution. To this end, the processor 212 may include a general-purpose processor such as an x86 processor or an ARM processor, which are available from various vendors. However, the processor 212 may also be implemented using an application specific processor, programmable gate arrays, and/or other logic circuitry.

The memory 214 may store instructions and/or data to be executed and/or otherwise accessed by the processor 212. In some embodiments, the memory 214 may be completely and/or partially integrated with the processor 212. The memory 214 may store software and/or firmware instructions, which may be executed by processor 212. The memory 214 may further store various types of data which the processor 212 may access, modify, and/or otherwise manipulate in response to executing instructions from memory 214. To this end, the memory 214 may comprise volatile and/or non-volatile storage devices such as randomaccess memory (RAM) devices, read only memory (ROM) devices, flash memory devices, solid state device (SSD) drives, etc.

The network interface 216 may enable the miner 200 to communicate with other computing devices such as the pool server 132. In particular, the network interface 216 may permit the processor 212 to obtain jobs from the pool server 132 and submit completed jobs to the pool server 132. To this end, the networking interface 216 may include a wired networking interface such as an Ethernet (IEEE 802.3) interface, a wireless networking interface such as a WiFi (IEEE 802.11) interface, a radio or mobile interface such as a cellular interface (GSM, CDMA, LTE, 5G, etc.), and/or some other type of networking interface capable of providing a communications link between the miner 200 and other devices such as the pool server 132.

Finally, the I/O interfaces 218 may generally provide communications and control paths between the processor 212 and other components of the miner 200 such as the compute boards 220, power supply 230, and cooling system 240. Via such interfaces, the processor 212 may control the operation of such components. For example, the processor 212 may use such I/O interfaces 218 to initialize the compute boards 220, distribute jobs to the compute boards 220, receive completed jobs from the compute boards 220, selectively enable/disable the power supply 230, and selectively turn on/off cooling system 240, among other things.

In various embodiments, the one or more I/O interfaces 218 include communication interfaces such as a Serial Peripheral Interface (SPI) interface and/or an Inter-Integrated Circuit (I2C) interface via which the processor 212 may communicate with the compute boards 220. In particular, each compute board 220 may include a board connector and/or communication interface 221. A bus such as, for example, a four-wire SPI serial bus may connect the compute modules 222 of the compute boards 220 to the miner controller 210 via the board connector 221 and their respective SPI interfaces. In such an embodiment, the miner controller 210 and compute modules 222 may operate in a master-slave arrangement, wherein the miner controller 210 acts as the single master of the bus and each of the compute modules 222 operate as slaves on the bus. In such embodiments, the miner controller 210 may assign jobs to the compute modules 222 and the compute modules 222 may push completed jobs to the miner controller 210 upon completion. In various embodiments, the miner controller 210 and compute modules 222 may utilize an SPI interface and associated SPI bus segments to communicate. However, other interconnect technologies may be used in other embodiments.

Each compute board 220 may include a board connector 221 and several compute modules 222 coupled to the board connector 221 via one or more bus segments. Each compute module 222, likewise, may include several compute engines that perform computational aspects of completing a job. In various embodiments, each compute module 222 is implemented via an application specific integrated circuit (ASIC). However, the compute modules 222 and their respective compute engines may be provided by other forms of circuitry such as field programmable gate arrays (FPGAs).

In various embodiments, a miner 200 includes 4 compute boards, each compute board 220 includes 28 compute modules 222, and each compute module 222 includes 12 compute engines. Such a miner 200 thus provides 1,344 (4×28×12) compute engines. The above quantities of compute boards 220, compute modules 222, and compute engines were provided merely for context. Other embodiments of the miner 200 may include different quantities of such components.

Per the Bitcoin standard, a candidate block header must have a message digest or hash value that satisfies a current target value in order to be deemed a valid block header suitable for adding to the blockchain. Such a message digest is computed per a double SHA256 hash of the block header. Specifically, a compute engine generates a double SHA256 hash of a candidate block header by computing a first message digest or hash value of the candidate block header per the SHA256 algorithm specified by Federal Information Processing Standards Publication 180-4 (FIPS Pub. 180-4). The compute engine then computes a second message digest or final hash value of the candidate block header by performing a SHA256 hash of the first message digest. Thus, the compute engine performs a double hash of the candidate block header to determine whether its double hash value satisfies a target value and is therefore a valid block header. Thus, for Bitcoin and various Altcoin embodiments of the miner 200, the compute boards 220 may also be referred to as hashing boards 220 since the compute engines perform various hashing functions and/or various cryptographic algorithms addressing a similar goal as such hashing functions.

While Bitcoin and some other cryptocurrencies utilize the SHA256 hashing algorithm as part of their Proof-of-Work algorithms, other cryptocurrencies may use other cryptographic and/or hashing algorithms as part of their Proof-of-Work algorithm. For example, Litecoin and Dogecoin use the scrypt key-derivation function and Ethereum uses the Ethash algorithm. Thus, for embodiments of the miner 200 designed to mine such Altcoins, the compute boards 220 may include compute modules 222 designed to compute these other cryptographic algorithms.

The power supply 230 generally converts alternating current (AC) voltage to a direct current (DC) voltage suitable for the compute boards 220 and other components of the miner 200. In various embodiments, the power supply 230 receives 220V AC voltage from, for example, a wall mains outlet and efficiently converts the received power to one or more DC voltages distributed to various components of the miner 200. As shown, the power supply 230 may include a control power supply 232, one or more compute power supplies 234, as well as other power supplies. The control power supply 232 may supply control power (e.g., via one or more supplied DC voltages) used to power a control power domain of the compute boards 220. The one or more compute power supplies 234 may supply compute power (e.g., via one or more supplied DC voltages) used to power a compute power domain of the compute boards 220.

In various embodiments, the control power supply 232 and compute power supply 234 are selectively enabled via one or more signals of the miner controller 210. As such, the miner controller 210 may selectively enable/disable the power supplies 232, 234 so as to selectively power-up/ power-down the respective power domains of the compute boards 220. For example, the miner controller 210 may power-up the control power domain of the compute boards 220 in order to configure and confirm operation of the compute boards 220 before powering-up the compute domain, which in certain embodiments consumes substantially more power than the control power domain.

The cooling system 240 generally comprises active thermal components (e.g., cooling fans, liquid cooling systems, Peltier cooling modules, etc.) that aid in maintaining the other components of the miner 200, especially the compute boards 220, within a thermal envelope associated with high operating efficiency. Beyond the active thermal components of the cooling system 240, the miner 200 may include other passive thermal components such as heat sinks, heat pipes, thermal paste, etc. that further aid in maintaining the components of the miner 200 within the desired thermal envelope.

In various embodiments, the miner controller 210 and compute modules 222 are coupled to one another via one or more busses (e.g., one or more SPI buses, I2C buses, etc.) Moreover, the miner controller and compute modules 222 may interact via master-slave protocols in which the miner controller 210 operates as the master and the compute modules 222 operate as slaves. To this end, the miner controller 210 may control the operation of the compute modules via commands issued over the one or more busses, which couple the compute modules 222 to the miner controller 210. A general format for such commands is shown in FIG. 6, which is described below.

As noted above, a candidate block header must have a message digest or hash value that satisfies a current target value in order to add a block and its header to the blockchain. To better understand the search for such a valid block header, reference is made to the block header depicted in FIG. 3. As shown, the block header includes a first message block (Message Block 1) and a second message block (Message Block 1). Message Block 1 comprises a 32-bit version (Version) field, a 256-bit previous hash (Previous Hash) field, and 224-bit Merkle root head (Merkle Root Head) field. Message Block 2 comprises a 32-bit Merkle root tail (Merkle Root Tail) field, a 32-bit timestamp (Timestamp) field, a 32-bit difficulty (Difficulty) field, a 32-bit nonce (Nonce) field, and 384-bit padding (Padding) field.

The Version field may store a value that indicates which set of block validations apply to the block. The Previous Hash field may store a message digest or double SHA256 hash of the previous block in the blockchain. The Previous Hash field may ensure that no previous block in the blockchain may be changed without also changing the block header of the present block. The Merkle Root Head field and Merkle Root Tail field may collectively store a Merkle root value that spans Message Block 1 and Message Block 2. The Merkle root value is derived from a SHA256 hash of all transactions included in the block and may ensure that none of the transactions included in the block may be altered without altering the block header.

The Timestamp field may store a value that represents a time at which a miner claims to have started hashing the block header. The Difficulty field may store a value that represents the current target value for the message digest, namely the number of leading zeros that must exist in the message digest or SHA256 hash for a candidate block header to be a valid block header. The Nonce field may store a nonce value, which is value that a miner may modify in search of a block header that produces a message digest with at least the leading number of zeros specified by the Difficulty field.

While a miner may alter the nonce value in the Nonce field in search of a valid block header, the range of values supported by the Nonce field may not be sufficient to find a block header that satisfies the target specified by the Difficulty field. As such, pool servers 132 and/or miners 134 may utilizes other aspects of the current block as extra nonce so as to achieve the target as described below.

Figure 4:
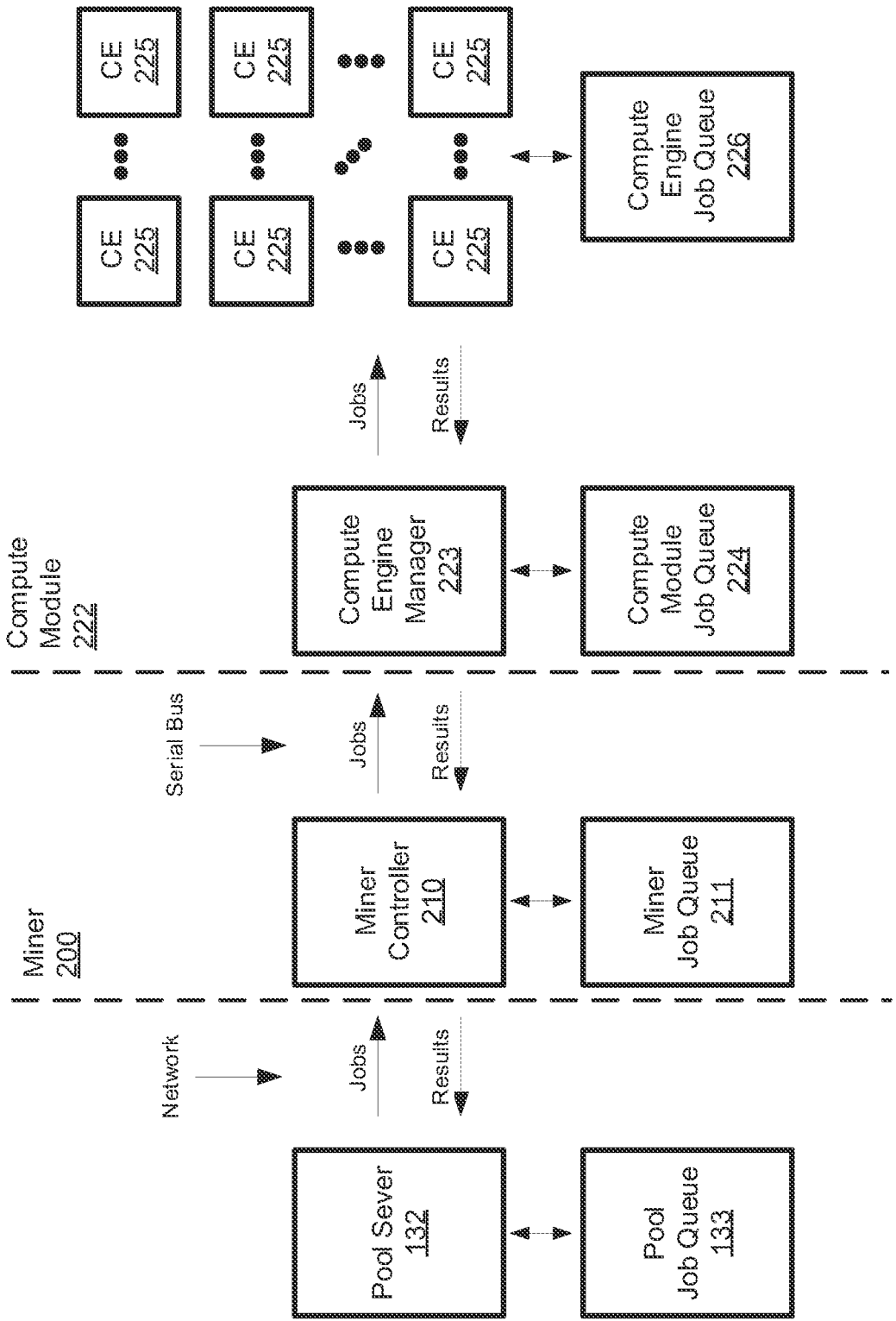
FIG. 4 depicts flow of jobs between layers of the cryptocurrency network of FIG. 1.
Figure 5:
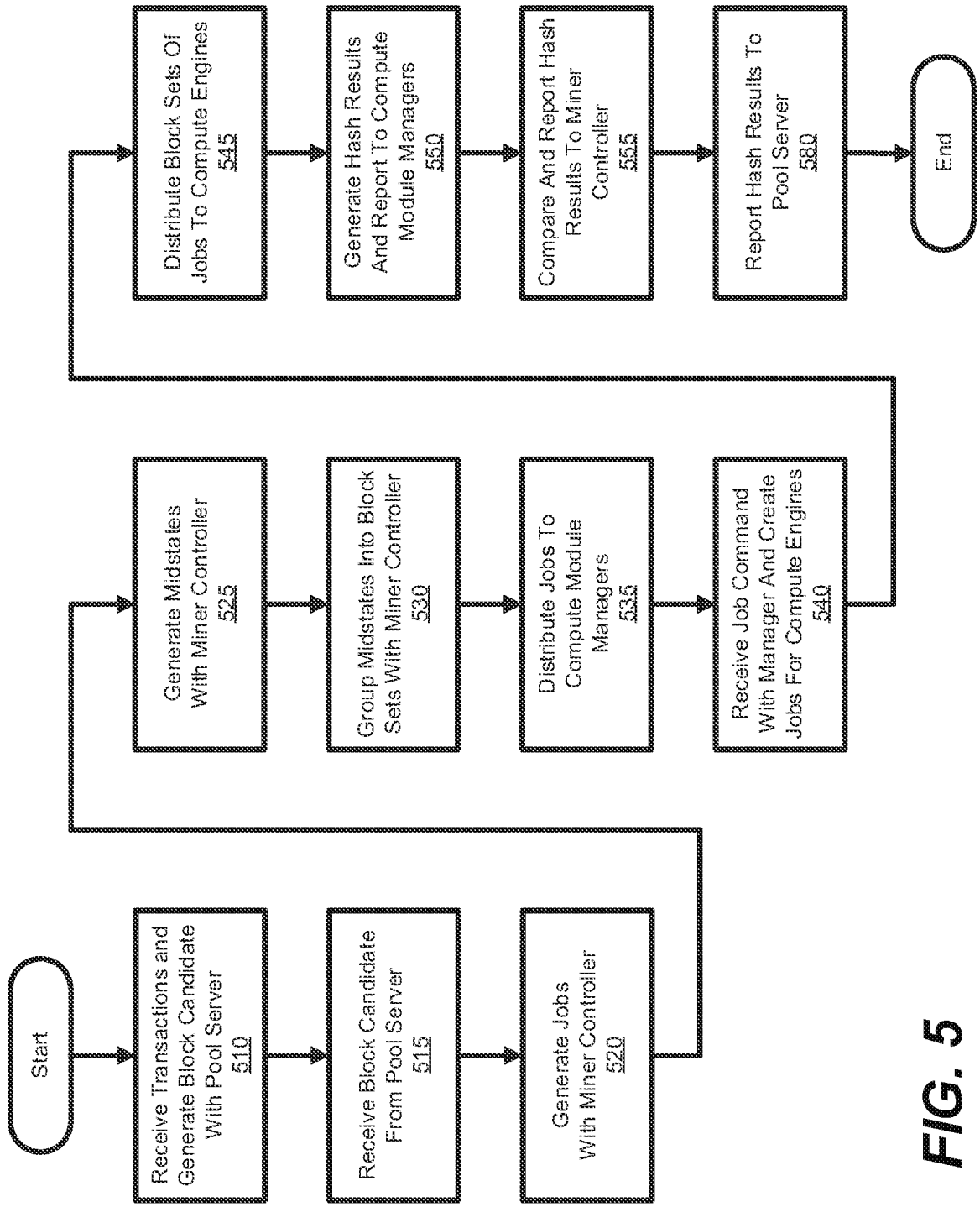
FIG. 5 depicts a flowchart for an example process of distributing jobs to compute modules of the miner of FIG. 2.

FIGS. 4 and 5 depict a process of generating and distributing jobs to miners 134 of the cryptocurrency network 100. More specifically, FIG. 4 depicts a high-level flow of jobs from a pool server 134 to compute engines 225 and job results from compute engines 225 to the pool server 134. FIG. 5 depicts a flowchart for an example process 500 of generating, distributing, and processing jobs.

More specifically, the pool server 132 at 510 may collect blockchain transactions from the cryptocurrency network 100, create a candidate block for the collected blockchain transaction, and queue the candidate block and associated transactions in its job queue 133. A miner, such as miner 200 of FIG. 2 at 515, may receive a candidate block or job from the pool server 132. In particular, the miner controller 210 of the miner 200 may negotiate with the pool server 132 and receive a job from the job queue 133 of the pool server 132 based on a pre-negotiated extra nonce range and a pre-negotiated version range of the miner 200.

At 520, the miner controller 210 may create jobs for processing the candidate block by manipulating an extra nonce value of the candidate block per the extra nonce range of the miner 200. In particular, the miner controller 210 may roll the extra nonce value in a coinbase transaction of the candidate block across the extra nonce range of the miner controller 210. In various embodiments, the miner controller 210 at 520 may further roll the version value across the version range of the miner 200 in order to create additional jobs for the compute modules 222.

To account for rolling of the extra nonce value of the coinbase transaction, the miner controller 210 may further update the Merkle root value of a candidate block header. Since the Merkle root value is derived from a SHA256 hash of the transactions for the candidate block, changing the extra nonce value of a coinbase transaction changes the Merkle root value of the candidate block. In various embodiments, the miner controller 210 may associate a Merkel root tail value and a difficulty value with a message block identifier (MB_ID) for a candidate block header and store such association in the its job queue 211. In this manner, each MB_ID may be associated with a candidate block header having a fixed Merkel root tail value and a fixed difficulty value.

Figure 3:
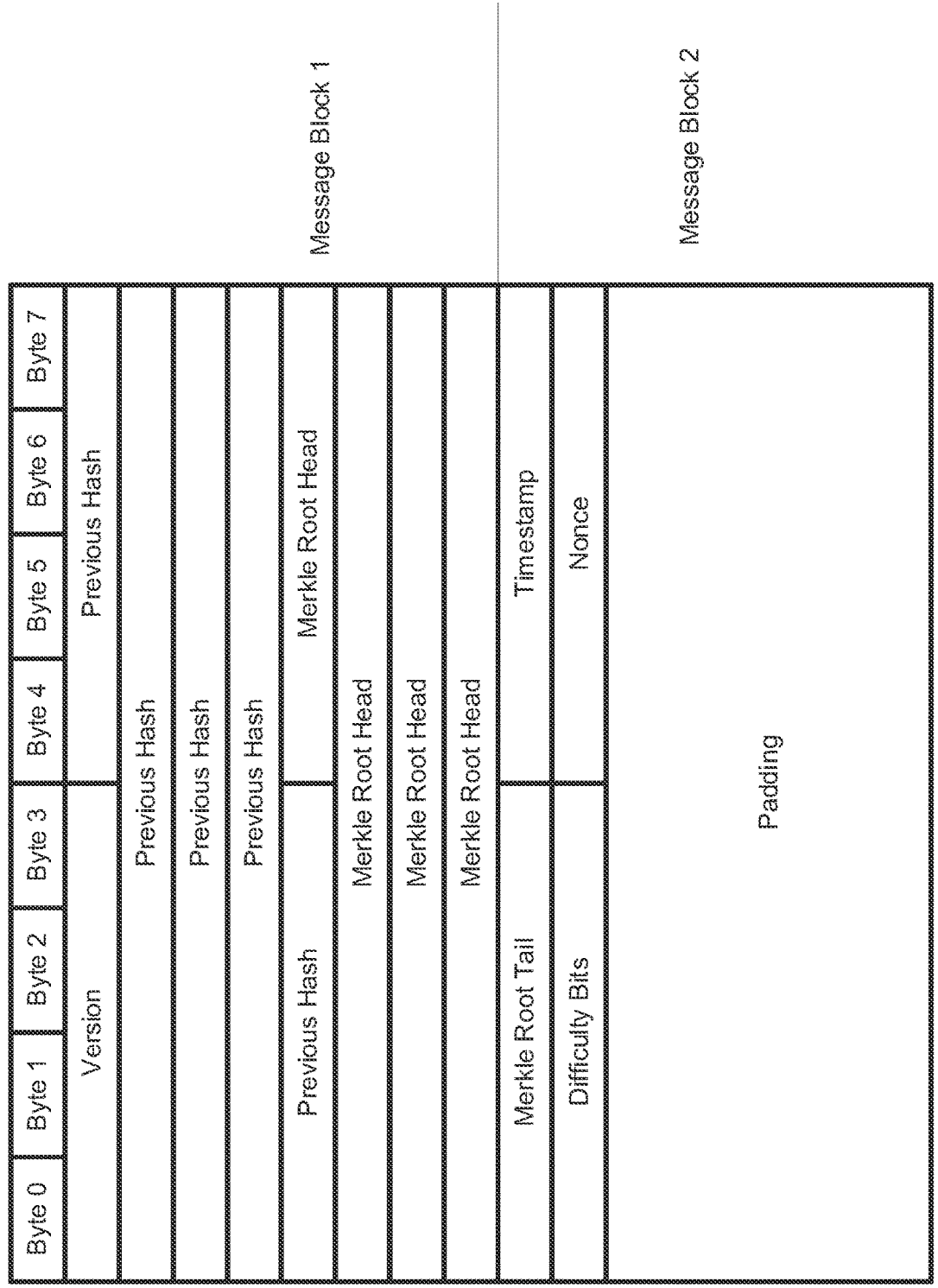
FIG. 3 depicts a message block header created by the miner of FIG. 2.

At 525, the miner controller 210 may further calculate a midstate (MB1_Midstate) value for each MB_ID and its associated candidate block header by generating a message digest or SHA256 hash of Message Block 1 of the candidate block header. As shown in FIG. 3, Message Block 1 includes the Version field, the Previous Hash field, and the Merkle Root Head field. As noted above, the miner controller 210 rolls the extra nonce value through an extra nonce range and may additionally roll the version value through a version range. Moreover, changes in the extra nonce result in changes in the Merkle root value. Thus, while the Previous Hash field may be fixed for each of job generated at 520, the Merkle Root Head field changes due to the rolling extra nonce value in the transaction. Moreover, the Version field may change due to rolling its version value. As such, the miner controller 210 may calculate the MB1_Midstate value for each candidate block header based on its respective Merkle root head value and/or version value. The miner controller 210 may store the calculated MB1_Midstate values and associate such stored MB1_Midstate values with a midstate index (MSIdx) in the job queue 211.

The miner controller 210 at 530 may create one or more hashing jobs for the compute modules 222. In various embodiments, each hashing job comprises one or more block sets. Moreover, each block set corresponds to candidate blocks that differ in the first message block (Message Block 1) but have a common message portion, where the common message portion corresponds to the Merkle Root Tail field, the Timestamp field, and Difficulty field of Message Block 2 (see, e.g., FIG. 3). Thus, the miner controller 210 may define hashing jobs by grouping the generated candidate block headers into block sets based on the respective MB1_Midstate and Merkle root tail values for the candidate block headers so that each block set differs in the first message block (Message Block 1) but has a common message portion. The miner controller 210 may further associate a block set identifier (BS_ID) with each created block set in its job queue 211.

At 535, the miner controller 210 may distribute the hashing jobs to the compute modules 222. To this end, the miner controller 210 may issue a Job Submit command which delivers one or more hashing jobs to one or more compute modules 222 via a serial bus interface between the miner controller 210 and compute modules 222. As explained in greater detail below, the Job Submit command may include one or more job elements that provide Merkle root tail values, timestamp values, difficulty values and other values that specify aspects of a candidate block for processing by a compute module 222 and its compute engines 225. As such, the miner controller 210 create a Job Submit command by populating fields of the command with appropriate values of the one or more the block sets of a hashing job. The miner controller 210 may then issue the Job Submit command in order to deliver one or more hashing jobs to one or more targeted compute modules 222.

The compute module manager 223 of each compute module 222 at 540 may receive the issued Job Submit command via the serial bus and create hashing jobs for compute engines 225. As explained below, the Job Submit command may be directed to a single compute module 222 or may be directed to multiple compute modules 222. As such, while a compute module manager 223 may receive a Job Submit command, the compute module manager 223 may determine that the Job Submit command is not directed to it and thus may effectively ignore the Job Submit command and not distribute hashing jobs of the Job Submit command to its compute engines 225 for processing.

However, assuming the Job Submit command is directed to the compute module manager 223, the compute module manager 223 may create and queue hashing jobs for its compute engines 225. To this end, the compute module manager 223 may create hashing jobs based on the block sets of the Job Submit command and place the generated hashing jobs in its job queue 224 until delivered to a compute engine 225. In various embodiments, the computer module manager 223 may create further hashing jobs by rolling the timestamp value associated with the block sets across a timestamp range.

At 545, the compute module manager 223 may distribute block sets of the jobs in its job queue 224 to compute engines 225 which may store the received jobs in a respective job queue 226. In various embodiments, the computer module manager 223 may associate an engine index (EIdx) with each distributed job so that the compute module manager 223 may later retrieve the respective job details when a compute engine 225 reports a hit.

Each compute engine 225 at 550 may process a job and report results. In particular, the a compute engine 225 may receive a job from the compute module manager 223 and store the job in a respective job queue 226 until ready to process the job. Moreover, each compute engine 225 may process a job by iterating over their configured Nonce range and calculating the message digest of the candidate block header specified by the block set of the job and the current nonce value. Further, if a compute engine 225 finds a message digest that meets the leading zeros criteria of the job, the compute engine 225 at 550 may report the result to the compute module manager 223. To this end, the compute engine 225 may provide the compute module manager 223 with its engine index (EIdx) and the respective nonce value of the hit.

At 555, the compute module manager 223 may report the received result to the miner controller 210. In particular, the compute module manager 223 may determine whether the result reported by the compute engine 225 corresponds to a message digest that meets the difficulty value for the job. To this end, the compute module manager 223 may retrieve the job details from the job queue 224 based on the engine index (EIdx) reported by the compute engine and may compute the message digest using the retrieved information and the reported nonce value. The compute module manager 223 may then determine whether the message digest it generated meets the difficulty value for the job. If the message satisfies the difficulty value, then the compute module manager 223 may report the result. In various embodiments, the compute module manager 223 reports the result by providing the miner controller 210 with the message block identifier (MB_ID), block set identifier (BS_ID), midstate index (MSIdx), timestamp, nonce, and engine index (EIdx) associated with the job.

In various embodiment, the leading zeros criteria used by the compute engines 225 is more lax than the difficulty value used by the compute module manager 223. Thus, the hit reported by the compute engine 225 may not satisfy the difficulty value of the job even if the compute engine 225 did not miscalculate the message digest. In the manner, the compute engines 225 may report hits at greater frequency. Such reports may be used to monitor the health of the compute engines 225 to ensure their proper operation.

At 560, the miner controller 210 may report the received result to the pool server 132. In particular, the miner controller 210 may determine whether the result reported by the compute module manager 223 corresponds to a message digest that meets the difficulty value for the job. To this end, the miner controller 210 may retrieve the job details from the job queue 211 based on values provided by the compute module manager 223 and may compute the message digest using the retrieved information and the reported values. The compute module manager 223 may then determine whether the message digest it generated meets the difficulty value for the job.

In various embodiments, the miner controller 210 and compute modules 222 are coupled to one another via one or more busses (e.g., one or more SPI buses, I2C buses, etc.) Moreover, the miner controller and compute modules 222 may interact via master-slave protocols in which the miner controller 210 operates as the master and the compute modules 222 operate as slaves. To this end, the miner controller 210 may control the operation of the compute modules 222 via commands issued over the one or more busses, which couple the compute modules 222 to the miner controller 210.

Further details regarding such commands and, in particular, a Job Submit command are described below with regard to FIGS. 6-12. The miner controller 210 at 535 may utilize such a Job Submit command to distribute hashing jobs to the compute modules 222.

A general format for commands which the miner controller 210 may issue to control operation of the compute modules 222 is shown in FIG. 6. In various embodiments, the commands are 8-bit aligned to ease parsing and generation at a hardware and software level. As shown, the command may include a device identifier (DevID) field, a reserved (Rsvd) field, an opcode (Opcode) field, a command data (Command Data) field, and a cyclical redundancy check (CRC) field.

The DevID field comprises a 16-bit field that stores a device identifier that may be used as a unicast or multicast address for identifying the destination of the command. In various embodiments, up to a predetermined number of addresses (e.g., six) may be associated with each compute module 222, and each compute module 222 may accept and process any command that has a device identifier in its DevID field that matches one of the its associated addresses. In various embodiments, all addresses associated with a compute module 222 are initially reset to a predefined reset value (e.g., 0xffffffff), which represents an uninitialized address.

The Opcode field specifies an operation that the destination device or devices are to perform in response to the received command. In various embodiments, the Opcode field may specify one of a no operation (NOP) operation, a write register (WRITE_REG) operation, a read register (READ_REG) operation, a multicast read register (MCAST_READ_REG) operation, or a job submit (JOB_SUBMIT) operation. The NOP operation results in the destination device performing no operation in response to the received command. The WRITE_REG operation results in the destination device writing a value specified by the Command Data field to a destination device register specified by the Command Data field. The READ_REG operation results in the destination device returning data read from a destination device register specified by the Command Data field. The MCAST_READ_REG operation results in multiple destination devices returning data read from respective destination device registers specified by the Command Data field. Finally, the JOB_SUBMIT operation submits a cryptographic job (e.g., a hashing job) to the destination device.

To support transferring such commands to the compute modules 222, the miner controller 210 may assign addresses to the compute modules 222 per an enumeration process. Per such an enumeration process, the miner controller 210 may assign a unique unicast address and one or more multicast addresses to each compute modules 222. In particular, the miner controller 210 may assign a unique unicast address to each compute module 222 and may assign a same multicast address to multiple compute modules 222. After such address assignments, the miner controller 210 may send a command to a specific compute module 222 by populating the DevID field of the command with the unicast address that was uniquely assigned to the specific compute module 222. Conversely, the miner controller 210 may simultaneously send a command to a group of compute modules 222 by using a multicast address that was assigned to each compute module 222 in the respective group of compute modules 222.

Referring now to FIGS. 7-10, specifics of the Job Submit command and an example format of the Job Submit command are shown. In particular, FIG. 7 depicts the fields of an example format for a Job Submit command of the present application. The Job Submit command may comprise, in addition to the DevID, Rsvd, Opcode, and CRC fields described above with regard to the general command format of FIG. 6, a number of block sets (Num_BS) field, a flags (Flags) field, and a job element (Job Element) field.

The Num_BS field in various embodiments is a 8-bit field that stores a value which represents or identifies the number of block set element (BS Element) fields that are present in the Job Submit command. For example, the Num_BS field may store a value of four (4) to indicate there are four BS Element fields in the Job Submit command. However, other methods of representing and/or encoding the quantity of BS Element fields via the Num_BS field are contemplated and encompassed by the appended claims.

The flags (Flags) field of the depicted embodiment is also an 8-bit field. The Flags field may provide various flag, status, and/or trigger conditions for the associated Job Submit command. In various embodiments, only a single bit of the 8-bit Flags field is defined and the remaining seven bits are reserved for future functionality. In such an embodiment, the single bit provides a status for a flush previous (Flush_Prev) flag. The Flush_Prev flag may be used to flag, trigger, or otherwise signal a flushing of previous jobs that are still awaiting processing. In particular, if the Flush_Prev flag is set, then any compute module 222 targeted by such a Job Submit command flushes all previous jobs in its job queues 211, 224, 226. In some embodiments, the compute module 222 may further flush and/or cease processing of its current job in additional to the jobs awaiting processing in its job queues 211, 224, 226. Moreover, the compute module 222 may schedule processing of the job or jobs defined by the received Job Submit command by placing the job or jobs at the head of its job queue 211.

The Job Element field may define one or more jobs for one or more targeted compute modules 222. To this end, as shown in FIG. 8, the Job Element field may comprise an 8-bit message block group identifier (MB_GID) field, a message block (MB) field, one or more 8-bit block set group identifier (BS_GID) fields, and one or more block set element (BS Element) fields associated with the BS_GID fields. As noted above, the Num_BS field of the Job Submit command may specify the number of BS Element fields in the Job Submit command. In various embodiments, the Job Submit command includes a BS_GID field for each BS Element field in the Job Element field. As such, the Num_BS field may also indirectly specify the number of BS_GID fields in the Job Submit command.

The MB_GID field may store a message block group identifier which identifies one or more compute module 222 to process the message block element in the MB Element field. In particular, a compute module 222, in various embodiments, may process the message block element and block set elements of the Job Submit command only if the message block group identifier in the MB_GID field matches or otherwise corresponds to the message block group identifier assigned to the compute module 222. Furthermore, if the message block group identifier in the MB_GID field does not match or otherwise correspond to the message block group identifier assigned to the compute module 222, the compute module 222, in various embodiments, ignores the Job Submit command even if a the block set group identifier in the BS_GID field matches or otherwise corresponds to a block set group identifier assigned to the compute module 222.

The MB Element field may represent a message block element to be processed by the targeted compute modules 222. To this end, as shown in FIG. 9, the MB Element field may comprise an 8-bit zeros target (Zeros Target) field, a 16-bit message block identifier (MB_ID) field, a 32-bit Merkle root tail (MerkleRoot Tail) field, a 32-bit timestamp (Timestamp) field, and 32-bit difficulty (Difficulty) field.

The Zeros Target field may store a value indicative of a minimum number of leading zeros that a double SHA256 result generated by a compute engine 225 must include before reporting such a result as a potential share or hit. In various embodiments, the Zeroes Target field may specify a smaller number of leading zeros than the Difficulty field specifies. In this manner, the compute engines 225 may report potential hits more frequently than if reporting based on the number of leading zeros specified by the Difficulty field.

The MB_ID field may store a unique identifier for the message block element of the Job Submit command. The miner controller 210 may use the unique identifier to uniquely track the message block element and access information maintained in a software database (e.g., job queue 211) for the message block element.

The Merkle Root Tail field may store the Merkle root tail for the message block element of the Job Submit command. In various embodiments, the Merkle root tail is passed as-is to the compute engines 225 of the compute modules.

The Timestamp field may store an initial timestamp for the message block element. The targeted compute modules 222 may create additional jobs from the job described in the Job Submit command by rolling the timestamp based on a range specified by a timestamp rolling parameter in its configuration space.

The Difficulty field may store a value representative of the Difficulty field for the message block header being computed. The value is passed to the compute engines 225 of the targeted compute modules 222 so the compute modules 222 may compute a message digest of the message block based on the Difficulty field. However, as noted above, the compute engines 225 in various embodiments base their determination of a potential hit or share upon the value provided by the Zeros Target field and not the value provided by the Difficulty field.

The BS_GID field may store a block set group identifier that identifies destination or target compute modules 222 for processing the associated block set element. In particular, a compute module 222, in various embodiments, may process a block set element of the Job Submit command only if the block set group identifier of the BS_GID field matches or otherwise corresponds to the block set group identifier assigned to the compute module 222. Furthermore, if the block set group identifier of the BS_GID field does not match or otherwise correspond to a block set group identifier assigned to the compute module 222, the compute module 222, in various embodiments, ignores the Job Submit command even if the message block group identifier of the MB_GID field matches or otherwise corresponds to a message block group identifier assigned to the compute module 222.

The BS Element field comprises various fields that define block sets for the targeted compute modules 222. In general, the compute engines 225 of the targeted compute modules 222 may execute hashing jobs specified by the block sets in parallel. More specifically, the compute engines 225 may operate in groups and execute their respective hashing jobs based on different message block midstates (MB1_Midstate). In various embodiments, the compute modules 222 may support up to a predefined number of midstates. As such, a single Job Submit command accounts for the midstate capabilities of the compute modules 222. To this end, the BS Element filed may include one or more block set identifiers (BS_ID) fields and corresponding MB1_Midstate fields to ensure block sets are directed to compute modules 222 with suitable midstate capabilities.

The BS_ID field may store a unique block set identifier for the block set. The miner controller 210 may use the block set identifier to maintain information regarding the correspond block set. Moreover, in various embodiments, the compute modules 222 may report the block set identifier back to the miner controller 210 when a potential hit or share is found.

The MB1_Midstate field may store the midstate of the candidate message block header, which corresponds to the message digest of SHA256 result of Message Block 1 of the candidate message block header. The compute engines 225 may utilize the midstate when computing the respective double SHA256 result of a block set. Such midstate values may boost or increase the processing rate and/or power efficiency of the compute engines 225 since the compute engines 225 may compute the double SHA256 results without recomputing the midstate of the candidate message block header.

Figure 11:
FIG. 11 shows an example distribution of jobs to the compute modules of the miner of FIG. 2 per a first example job submit command.
Figure 12:
FIG. 12 shows another example distribution of jobs to the compute modules of the miner of FIG. 2 per a second example job submit command.

Referring now to FIGS. 11 and 12, examples of distributing block sets to the compute modules 222 per example Job Submit commands is depicted. In particular, FIG. 11 depicts MB_GID, MB_ID, BS_GID, BS_ID, and MSIdx fields of an Job Submit command. Of note, a Job Submit command includes additional fields and only the fields relevant to the example distribution are presented. Moreover, the MSIdx fields correspond to the MB1_Midstate fields of a BS Element as shown FIG. 10 and identify a respective MB1_Midstate field based on its zero-based index of in its BS Element. The Job Submit commands would include the respective midstates in its MB1_Midstate fields. The MSIdx fields of FIG. 11 (and FIG. 12 described below) are provided to more clearly depict how the respective midstate values are assigned to the compute modules 222 and their job queues.

As shown, the Job submit command of FIG. 11 includes four block sets, which are identified with block identifiers of 0, 1, 2, and 3 in respective BS_ID fields. Furthermore, the four block sets are associated with a single message block and a single message block group, which are respectively identified with a message block identifier of 0 and a message block group identifier of 0 in the MB_ID field and the MB_GID. The four block sets are further associated with a single block set group, which is identified with a block set group identifier of 0 in the BS_GID field associated with each respective block set.

Compute modules 222 with device identifiers (DevID) of 0, 1, 2, 3 are also shown in FIG. 11. As further shown, the miner controller 210 has updated the configuration space of the compute modules 222 such that each of the compute modules 222 have been assigned the same message block group identifier of 0 and the same block set group identifier of 0. As such, each of compute modules 222 receives and queues the four block sets of the Job Submit command. While the compute modules 222 are assigned the same block sets, each may process the block sets per respective nonce ranges, which may be distinctly specified by the miner controller 210 via their respective configuration spaces.

Referring now to FIG. 12 another example Job Submit command is shown. As shown, the Job submit command of FIG. 12 includes eight block sets, which are identified with block identifiers of 10, 11, 12, 13, 14, 15, 16, 17 in respective BS_ID fields. Furthermore, the first four block sets (i.e., BS_IDs 10-14) are associated with a first message block and a first message block group, which are respectively identified with a message block identifier of 0 and a message block group identifier of 0 in the MB_ID field and the MB_GID field. Two of the block sets (i.e., BS_IDs 10 and 12) are further associated with a first block set group, which is identified with a block set group identifier of 0 in the BS_GID field associated with each respective block set. The other two block sets (i.e., BS_IDs 11 and 13) are further associated with a second block set group, which is identified with a block set group identifier of 1 in the BS_GID field associated with each respective block set.

The second four block sets (i.e., BS_IDs 14-17) are associated with a second message block and a second message block group, which are respectively identified with a message block identifier of 1 and a message block group identifier of 1 in the MB_ID field and the MB_GID field. Two of the block sets (i.e., BS_IDs 14 and 16) are further associated with a third block set group, which is identified with a block set group identifier of 2 in the BS_GID field associated with each respective block set. The other two block sets (i.e., BS_IDs 15 and 17) are further associated with a fourth block set group, which is identified with a block set group identifier of 3 in the BS_GID field associated with each respective block set.

As further shown, the miner controller 210 has updated the configuration space of the compute modules 222 to assign the first compute modules 222 (DevID of 0) to the first message block group (MB_GID of 0) and the first block set group (BS_GID of 0). Similarly, the miner controller 210 has updated the configuration spaces of the other compute modules 222 such that the second compute module 222 (DevID of 1) is assigned to the second message block group (MB_GID of 1) and the second block set group (BS_GID of 1), the third compute module 222 (DevID of 2) is assigned to the third message block group (MB_GID of 2) and the third block set group (BS_GID of 2), and the fourth compute module 222 (DevID of 3) is assigned to the third message block group (MB_GID of 3) and the third block set group (BS_GID of 3).

Due to such configuration of the compute modules 222, the first compute module 222 (DevID of 0) receives and queues the block sets (BS_ID 10 and 12) of the first message block group (MB_GID of 0) and the first block set group (BS_GID of 0), and the second compute module 222 (DevID of 1) receives and queues the block sets (BS_ID 11 and 13) of the second message block group (MB_GID of 1) and the second block set group (BS_GID of 1). Similarly, the third compute module 222 (DevID of 1) receives and queues the block sets (BS_ID 14 and 16) of the third message block group (MB_GID of 2) and the third block set group (BS_GID of 2), and the fourth compute module 222 (DevID of 3) receives and queues the block sets (BS_ID 15 and 17) of the fourth message block group (MB_GID of 3) and the fourth block set group (BS_GID of 3). Each compute module 222 may process their respective block sets per respective nonce ranges, which may be distinctly specified by the miner controller 210 via their respective configuration spaces.

While the foregoing has been described with reference to certain aspects and examples, those skilled in the art understand that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular examples disclosed, but that the disclosure includes all examples falling within the scope of the appended claims.

What is claimed is:

1. A cryptocurrency miner, comprising:
a serial bus;
a communication interface;
a plurality of compute integrated circuits, wherein each compute integrated circuit comprises a plurality of compute engines; and
a controller coupled to the plurality of compute integrated circuits via the serial bus;
wherein the controller is configured to receive a candidate block for a blockchain via the communication interface, compute one or more midstates for the candidate block, generate one or more jobs for the one more midstates, and issue a job submit command on the serial bus that distributes the one or more jobs including their respective one or more midstates among the plurality of compute integrated circuits;
wherein each compute engine is configured to compute a hash for a job based on its respective midstate of the job submit command; and
wherein each compute integrated circuit in a first group of the plurality of compute integrated circuits is configured to process a job of the one or more jobs in response to determining that a device identifier of the job submit command corresponds to a multicast address associated with each compute integrated circuit in the first group.

2. A cryptocurrency miner, comprising:
a serial bus;
a communication interface;
a plurality of compute integrated circuits, wherein each compute integrated circuit comprises a plurality of compute engines; and
a controller coupled to the plurality of compute integrated circuits via the serial bus;
wherein the controller is configured to receive a candidate block for a blockchain via the communication interface, compute one or more midstates for the candidate block, generate one or more jobs for the one more midstates, and issue a job submit command on the serial bus that distributes the one or more jobs including their respective one or more midstates among the plurality of compute integrated circuits;
wherein the job submit command comprises a plurality of block sets that at least partially define the one or more jobs;
wherein each block set comprises a plurality of midstates corresponding to a plurality of message blocks;
wherein each compute engine is configured to compute a hash for a job based on its respective midstate of the job submit command; and
wherein a first compute integrated circuit of the plurality of compute integrated circuits is configured to process a block set of the plurality of block sets in response to determining that a block set group identifier of the job submit command corresponds to a block set group identifier associated with the first compute integrated circuit.

3. A cryptocurrency miner, comprising:
a serial bus;
a communication interface;
a plurality of compute integrated circuits, wherein each compute integrated circuit comprises a plurality of compute engines; and
a controller coupled to the plurality of compute integrated circuits via the serial bus;
wherein the controller is configured to receive a candidate block for a blockchain via the communication interface, compute one or more midstates for the candidate block, generate one or more jobs for the one more midstates, and issue a job submit command on the serial bus that distributes the one or more jobs including their respective one or more midstates among the plurality of compute integrated circuits;

wherein the job submit command comprises a plurality of block sets that at least partially define the one or more jobs;

wherein each block set comprises a plurality of midstates corresponding to a plurality of message blocks;

wherein each compute engine is configured to compute a hash for a job based on its respective midstate of the job submit command; and wherein a first compute integrated circuit of the plurality of compute integrated circuits is configured to process a block set of the plurality of block sets in response to determining that a message block identifier and a block set group identifier of the job submit command respectively correspond to a message block identifier and a block set group identifier associated with the first compute integrated circuit.

4. The cryptocurrency miner of claim 3, wherein the job submit command includes a difficulty field corresponding to a difficulty value of the candidate block and a zeros target field specifying a target value for the one or more jobs that is more lax than the difficulty value of the candidate block.

5. The cryptocurrency miner of claim 3, wherein the controller is configured to roll an extra nonce of a transaction to create jobs for the candidate block that differ in a Merkle root tail.

6. A method distributing jobs to compute integrated circuits of a cryptocurrency miner, the method comprising:

receiving, with a controller of the cryptocurrency miner, a candidate block for a blockchain;

generating, with the controller, jobs based on the candidate block, wherein the jobs include one or more midstates computed by the controller for the candidate block;

issuing, from the controller, a job submit command to the compute integrated circuits, wherein the job submit command comprises a plurality of jobs from the jobs generated based on the candidate block, and wherein the plurality of jobs include their respective one or more midstates;

processing the plurality of jobs with one or more compute integrated circuits, wherein processing a job of the plurality of jobs comprises generating hashes based on a midstate provided by the job submit command; and processing a job of the plurality of jobs with each compute integrated circuit in a first group of the compute integrated circuits in response to determining that a device identifier of the job submit command corresponds to a multicast address associated with each compute module in the first group.

7. The method of claim 6, comprising generating block sets that at least partially define the plurality of jobs such that each block set comprises a plurality of midstates corresponding to a plurality of message blocks; and including a plurality of block sets from the generated block sets in the job submit command.

8. A method distributing jobs to compute integrated circuits of a cryptocurrency miner, the method comprising:

receiving, with a controller of the cryptocurrency miner, a candidate block for a blockchain;

generating, with the controller, jobs based on the candidate block, wherein the jobs include one or more midstates computed by the controller for the candidate block; and issuing, from the controller, a job submit command to the compute integrated circuits, wherein the job submit command comprises a plurality of jobs from the jobs generated based on the candidate block, and wherein the plurality of jobs include their respective one or more midstates;

generating block sets that at least partially define the plurality of jobs;

including a plurality of block sets from the generated block sets in the job submit command;

processing the plurality of jobs with one or more compute integrated circuits, wherein processing a job of the plurality of jobs comprises generating hashes based on a midstate provided by the job submit command; and processing a block set of the plurality of block sets with a first compute integrated circuit in response to determining that a block set group identifier of the job submit command corresponds to a block set group identifier associated with the first compute integrated circuit.

9. A method distributing jobs to compute integrated circuits of a cryptocurrency miner, the method comprising:

receiving, with a controller of the cryptocurrency miner, a candidate block for a blockchain;

generating, with the controller, jobs based on the candidate block, wherein the jobs include one or more midstates computed by the controller for the candidate block; and issuing, from the controller, a job submit command to the compute integrated circuits, wherein the job submit command comprises a plurality of jobs from the jobs generated based on the candidate block, and wherein the plurality of jobs include their respective one or more midstates;

generating block sets that at least partially define the plurality of jobs; and including a plurality of block sets from the generated block sets in the job submit command;

processing the plurality of jobs with one or more compute integrated circuits, wherein processing a job of the plurality of jobs comprises generating hashes based on a midstate provided by the job submit command; and processing a block set of the plurality of block sets with a first compute integrated circuit in response to determining that a message block identifier and a block set group identifier of the job submit command respectively correspond to a message block identifier and a block set group identifier associated with the first compute integrated circuit.

10. The method of claim 9, wherein the job submit command includes a difficulty field corresponding to a difficulty value of the candidate block and a zeros target field specifying a target value for the plurality of jobs that is more lax than the difficulty value of the candidate block.

11. The method of claim 9, wherein generating the jobs with the controller comprises rolling an extra nonce of a transaction of the candidate block to differ a Merkle root of the generated jobs.

12. The method of claim 6, wherein the job submit command includes a difficulty field corresponding to a difficulty value of the candidate block and a zeros target field specifying a target value for the plurality of jobs that is more lax than the difficulty value of the candidate block.

13. The method of claim 6, wherein generating the jobs with the controller comprises rolling an extra nonce of a transaction of the candidate block to differ a Merkle root of the generated jobs.

14. The method of claim 8, wherein the job submit command includes a difficulty field corresponding to a difficulty value of the candidate block and a zeros target field specifying a target value for the plurality of jobs that is more lax than the difficulty value of the candidate block.

15. The method of claim 8, wherein generating the jobs with the controller comprises rolling an extra nonce of a transaction of the candidate block to differ a Merkle root of the generated jobs.

16. The cryptocurrency miner of claim 1, wherein the job submit command includes a difficulty field corresponding to a difficulty value of the candidate block and a zeros target field specifying a target value for the one or more jobs that is more lax than the difficulty value of the candidate block.

17. The cryptocurrency miner of claim 1, wherein the controller is configured to roll an extra nonce of a transaction to create jobs for the candidate block that differ in a Merkle root tail.

18. The cryptocurrency miner of claim 2, wherein the job submit command includes a difficulty field corresponding to a difficulty value of the candidate block and a zeros target field specifying a target value for the one or more jobs that is more lax than the difficulty value of the candidate block.

19. The cryptocurrency miner of claim 2, wherein the controller is configured to roll an extra nonce of a transaction to create jobs for the candidate block that differ in a Merkle root tail.

* * * * *